(12) United States Patent
Keller et al.

(10) Patent No.: US 10,209,439 B2
(45) Date of Patent: Feb. 19, 2019

(54) MULTI-DIRECTIONAL OPTICAL RECEIVER AND METHOD

(71) Applicant: RAYTHEON COMPANY, Waltham, MA (US)

(72) Inventors: Sean D. Keller, Tucson, AZ (US); Gerald P. Uyeno, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/189,580

(22) Filed: Jun. 22, 2016

(65) Prior Publication Data

US 2017/0371098 A1 Dec. 28, 2017

(51) Int. Cl.
| | |
|---|---|
| *G02B 6/04* | (2006.01) |
| *G02B 6/08* | (2006.01) |
| *G02B 6/32* | (2006.01) |
| *G02B 6/35* | (2006.01) |
| *H04N 5/225* | (2006.01) |
| *H04N 5/232* | (2006.01) |
| *G01S 7/481* | (2006.01) |
| *H04N 1/193* | (2006.01) |

(52) U.S. Cl.
CPC .............. *G02B 6/08* (2013.01); *G02B 6/32* (2013.01); *G02B 6/3544* (2013.01); *H04N 5/2254* (2013.01); *G01S 7/4818* (2013.01); *H04N 1/1936* (2013.01); *H04N 5/23238* (2013.01)

(58) Field of Classification Search
None
See application file for complete search history.

(56) References Cited

U.S. PATENT DOCUMENTS

| | | | |
|---|---|---|---|
| 4,625,108 A | * | 11/1986 | Nestel ............... G01S 3/784 250/226 |
| 4,653,905 A | | 3/1987 | Farrar et al. |
| 4,965,453 A | | 10/1990 | Hoschette et al. |
| 5,005,979 A | | 4/1991 | Sontag et al. |
| 5,438,873 A | | 8/1995 | Wlodarczyk et al. |

(Continued)

OTHER PUBLICATIONS

Alter, et al., "Introduction to Fiber Optic Imaging", SCHOTT North America, Feb. 2007, 93 Pages.

(Continued)

*Primary Examiner* — Twyler L Haskins
*Assistant Examiner* — Wesley J Chiu
(74) *Attorney, Agent, or Firm* — Lando & Anastasi, LLP

(57) ABSTRACT

Aspects and embodiments are generally directed to optical systems, receivers, and methods. In one example, an optical receiver includes a plurality of fused fiber optic bundles, at least a first fused fiber optic bundle of the plurality of fused fiber optic bundles positioned to collect optical radiation from a scene, a multi-mode fiber optic cable coupled to each fused fiber optic bundle of the plurality of fused fiber optic bundles, the multi-mode fiber optic cable configured to propagate the collected optical radiation from each of the plurality of fused fiber optic bundles along a length of the multi-mode fiber optic cable, and a photo-detector coupled to the multi-mode fiber optic cable and configured to receive the collected optical radiation. A field of view of each fused fiber optic bundle of the plurality of fused fiber optic bundles may collectively define a substantially omnidirectional field of view of the photo-detector.

17 Claims, 7 Drawing Sheets

(56) References Cited

U.S. PATENT DOCUMENTS

| | | | |
|---|---|---|---|
| 6,021,241 A * | 2/2000 | Bilbro | G02B 6/08 348/E5.028 |
| 6,163,372 A | 12/2000 | Sallee et al. | |
| 6,208,678 B1 * | 3/2001 | King | H01S 5/06213 372/6 |
| 6,215,593 B1 | 4/2001 | Bruce | |
| 6,611,282 B1 | 8/2003 | Trubko et al. | |
| 6,631,230 B1 * | 10/2003 | Campbell | G02B 6/06 385/116 |
| 6,943,873 B2 * | 9/2005 | Sallee | F41G 7/2246 356/141.1 |
| 6,950,570 B1 | 9/2005 | Novotny | |
| 7,376,314 B2 * | 5/2008 | Reininger | G02B 6/06 385/116 |
| 7,575,190 B2 | 8/2009 | Sallee | |
| 7,760,334 B1 | 7/2010 | Evans | |
| 8,035,822 B2 | 10/2011 | Riza et al. | |
| 8,294,879 B2 | 10/2012 | Silny et al. | |
| 8,351,114 B2 | 1/2013 | Nelson et al. | |
| 8,817,271 B1 | 8/2014 | Geary | |
| 8,836,848 B2 * | 9/2014 | Neutzler | H04N 5/2254 348/340 |
| 8,970,740 B2 | 3/2015 | Herman et al. | |
| 2003/0103744 A1 * | 6/2003 | Koyama | H04N 5/2254 385/116 |
| 2004/0165847 A1 * | 8/2004 | Kim | H04N 5/2254 385/116 |
| 2008/0283729 A1 * | 11/2008 | Hosaka | H04N 5/332 250/208.1 |
| 2009/0142066 A1 | 6/2009 | Leclair et al. | |
| 2009/0321861 A1 * | 12/2009 | Oliver | H01L 27/14618 257/432 |
| 2010/0195195 A1 * | 8/2010 | Nelson | G02B 6/2835 359/341.32 |
| 2010/0277617 A1 * | 11/2010 | Hollinger | H04N 5/2252 348/231.99 |
| 2010/0321471 A1 * | 12/2010 | Casolara | H04N 5/2254 348/36 |
| 2011/0181767 A1 * | 7/2011 | Neutzler | H04N 5/2254 348/340 |
| 2011/0242272 A1 * | 10/2011 | Tabor | G02B 6/06 348/36 |
| 2012/0008961 A1 * | 1/2012 | Chen | H04B 10/1121 398/119 |
| 2012/0120382 A1 * | 5/2012 | Silny | G01S 17/42 356/4.01 |
| 2012/0286147 A1 * | 11/2012 | Hvass | G01S 3/781 250/239 |
| 2014/0313321 A1 * | 10/2014 | Olsson | G01C 21/165 348/135 |
| 2015/0207990 A1 | 7/2015 | Ford et al. | |
| 2015/0241206 A1 * | 8/2015 | Kasai | G01B 11/12 356/511 |
| 2015/0333828 A1 * | 11/2015 | Murshid | H04B 10/1121 398/130 |
| 2016/0291115 A1 * | 10/2016 | Ai | G01S 3/786 |
| 2017/0041534 A1 * | 2/2017 | Xia | H04N 5/23238 |

OTHER PUBLICATIONS

Geary, et al., "Dragonfly Directional Sensor", SPIE, Optical Engineering, vol. 52, Feb. 2013, 9 Pages.

* cited by examiner

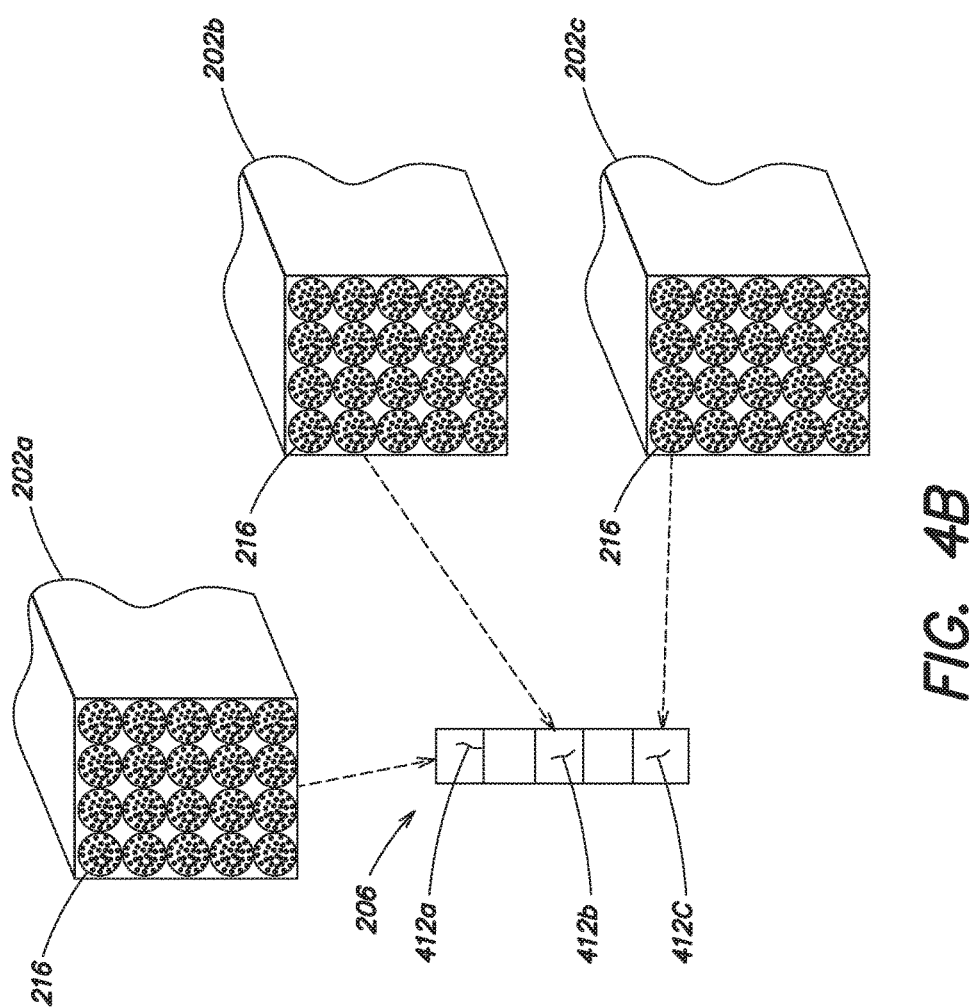

MULTI-DIRECTIONAL OPTICAL RECEIVER AND METHOD

BACKGROUND

Optical remote sensing systems and devices are used in numerous military and commercial applications. Various optical systems demand multi-directional radiation collection over a large field of view for effective operation. For instance, many optical systems, such as those employed in collision avoidance systems for unmanned vehicles, include numerous photo-detectors and associated optics arranged to collectively receive radiation over the desired angular range. However, these systems traditionally require complex optics to provide a line-of-sight between the collection apertures and the numerous photo-detectors. The complex optics can increase the size, weight, power, and cost of the system, and make most multi-directional collection systems impractical for small platforms.

SUMMARY OF THE INVENTION

Aspects and embodiments are generally directed to optical systems and methods, and in particular, to multi-directional optical receivers and methods of using the same. Aspects and embodiments include solid-state active components and/or non-mechanical optical elements for improved weight reduction and reduced power consumption during such conditions. One example of an optical receiver includes a plurality of fused fiber optic bundles coupled to a single photo-detector, and positioned to directly collect optical radiation from a scene. In particular, a field of view of each of the fused fiber optic bundles collectively defines an omnidirectional field of view of the photo-detector. In various other arrangements, a field of view of each of the fused fiber optic bundles collectively defines a distributed aperture of the optical receiver. Accordingly, in addition to allowing a more simplified active optical system when compared to typical multi-directional optical receivers, various aspects and embodiments provide a reduced weight, size, and power consumption optical receiver for ground, mobile, maritime, airborne, and space applications.

According to an aspect, provided is an optical receiver. In one example, the optical receiver includes a plurality of fused fiber optic bundles, at least a first fused fiber optic bundle of the plurality of fused fiber optic bundles positioned to collect optical radiation from a scene, a multi-mode fiber optic cable coupled to each fused fiber optic bundle of the plurality of fused fiber optic bundles, the multi-mode fiber optic cable configured to propagate the collected optical radiation from each of the plurality of fused fiber optic bundles along a length of the multi-mode fiber optic cable; and a photo-detector coupled to the multi-mode fiber optic cable and configured to receive the collected optical radiation, and a field of view of each fused fiber optic bundle of the plurality of fused fiber optic bundles collectively defines a substantially omnidirectional field of view of the photo-detector.

In one embodiment, the optical receiver further includes a plurality of fiber couplings interposed between each fused fiber optic bundle and the multi-mode fiber optic cable, and at least one of the plurality of fiber couplings includes a microlens array. In an embodiment, the photo-detector is a Focal Plane Array (FPA) having a single linear array of unit cells. According to an embodiment, the optical receiver further includes a fiber optic switch coupled to the multi-mode fiber optic cable, the fiber optic switch being configured to selectively control the propagation of the collected optical radiation to the single linear array of unit cells of the FPA, and a read-out integrated circuit coupled to the FPA and configured to generate one or more read-out values based on the collected optical radiation, the one or more read-out values being synchronized with an activation state of the fiber optic switch.

According to an embodiment, the photo-detector includes a single unit cell. In an embodiment, the optical receiver further includes a fiber optic switch coupled to the multi-mode fiber optic cable, the fiber optic switch being configured to selectively control the propagation of the collected optical radiation to the single unit cell of the photo-detector, and a read-out integrated circuit coupled to the photo-detector and configured to generate one or more read-out values based on the collected optical radiation, the one or more read-out values being synchronized with an activation state of the fiber optic switch.

In an embodiment, the first fused fiber optic bundle includes a broadband fused fiber optic bundle positioned to collect polychromatic optical radiation, and the photo-detector further includes a color filter array configured to sort the polychromatic optical radiation by wavelength. According to an embodiment, the first fused fiber optic bundle includes a polarized fused fiber bundle having a polarized coating on a receiving surface thereof. In an embodiment, the substantially omnidirectional field of view includes a 360 degree field of view relative to a receiving surface of the first fused fiber optic bundle. In one embodiment, the optical receiver further includes at least one lens interposed between the multi-mode fiber optic cable and the photo-detector, the lens being positioned to direct the collected optical radiation onto a unit cell of the photo-detector.

According to an aspect, provided is a method of receiving optical radiation. In one example, the method includes collecting optical radiation from a scene at a first fused fiber optic bundle of a plurality of fused fiber optic bundles, propagating the collected optical radiation along a length of a multi-mode optic cable coupled to at least the first fused fiber optic bundle, and receiving the collected optical radiation at a photo-detector coupled to the multi-mode fiber optic cable, and a field of view of each fused fiber optic bundle of the plurality of fused fiber optic bundles collectively defines a substantially omnidirectional field of view of the photo-detector.

According to an embodiment, the method further includes selectively controlling the propagation of the collected optical radiation with a fiber optic switch coupled to the multi-mode fiber optic cable, and generating one or more read-out values based on the collected optical radiation, the one or more read-out values being synchronized with an activation state of the fiber optic switch.

In an embodiment, collecting the optical radiation at the first fused fiber optic bundle includes collecting the optical radiation at a substantially planar receiving surface of the first fused fiber optic bundle, the substantially planar receiving surface being disposed at an angle relative to a fiber axis of the first fused fiber optic bundle. According to an embodiment, collecting the optical radiation at the first fused fiber optic bundle includes collecting the optical radiation along the fiber axis of the fused fiber optic bundle, and the angle relative to the fiber axis is non-perpendicular. In one embodiment, the method further includes directing the collected optical radiation onto a unit cell of the photo-detector with at least one lens interposed between the multi-mode fiber optic cable and the photo-detector.

According to an aspect, provided is an optical system. In one example, the optical system includes an optical source configured to emit optical radiation toward a scene, a plurality of fused fiber optic bundles, at least a first fused fiber optic bundle of the plurality of fused fiber optic bundles being positioned to collect optical radiation reflected from the scene, a multi-mode fiber optic cable coupled to each fused fiber optic bundle of the plurality of fused fiber optic bundles, the multi-mode fiber optic cable being configured to propagate the collected optical radiation from each of the plurality of fused fiber optic bundles along a length of the multi-mode fiber optic cable, and a photo-detector coupled to the multi-mode fiber optic cable and configured to receive the collected optical radiation, and a field of view of each fused fiber optic bundle of the plurality of fused fiber optic bundles collectively defines a distributed aperture of the optical system.

According to an embodiment, the photo-detector is at least one of a Focal Plane Array (FPA) having a single linear array of unit cells and a photo-detector having a single unit cell. In an embodiment, the optical system further includes a fiber optic switch coupled to the multi-mode fiber optic cable, the fiber optic switch being configured to selectively control the propagation of the collected optical radiation to the photo-detector. In one embodiment, the optical system further includes a read-out integrated circuit coupled to the photo-detector and configured to generate one or more read-out values based on the collected optical radiation, the one or more read-out values being synchronized with an activation state of the fiber optic switch. In an embodiment, a receiving surface of the first fused fiber optic bundle is defined by a substantially non-symmetrical diameter.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 4A-4C are example illustrations of optical radiation received at the photo-detector of the optical receiver illustrated in FIG. 2, according to aspects of the invention.

DETAILED DESCRIPTION

Aspects and embodiments are generally directed to optical systems and methods, and in particular, to optical receivers having a multi-directional field of view, and methods of using the same. One example of an optical receiver includes a plurality of fused fiber optic bundles positioned to directly collect optical radiation from a scene, and direct that optical radiation to a single pixelated or non-pixelated photo-detector. In particular, a field of view of each of the fused fiber optic bundles collectively defines a multi-directional (e.g., omnidirectional) field of view of the photo-detector. In addition to allowing a more simplified active optical system, various aspects and embodiments provide a reduced weight, size, and power consumption optical receiver for ground, mobile, maritime, airborne, and space applications. Particularly, the photo-detector may include a reduced size photo-detector having a single linear array of unit cells, or a single unit cell. Such aspects and embodiments further simplify the optical receiver and reduce the weight, size, and power consumption of the associated system.

The ability of an optical system to view a desired area of a scene is generally defined by the angular range at which the photo-detector of that system may receive incident optical radiation (i.e., the field of view (FOV) of the photo-detector). As a conventional photo-detector with focusing optics may only have a FOV of a few degrees, data collection over a wide angular area, or in multiple directions, is significantly challenging with a single photo-detector. Accordingly, various conventional approaches to designing an optical system for multi-directional collection include multiple photo-detectors each having a field of view in a different direction. In such conventional approaches, the combined field of view of each of the multiple photo-detectors is used to receive information over a desired angular range. However, in addition to requiring a great deal of power to activate and control the multiple photo-detectors, the numerous optics associated with each photo-detector significantly increase the weight and size of the optical system.

Figure 1:
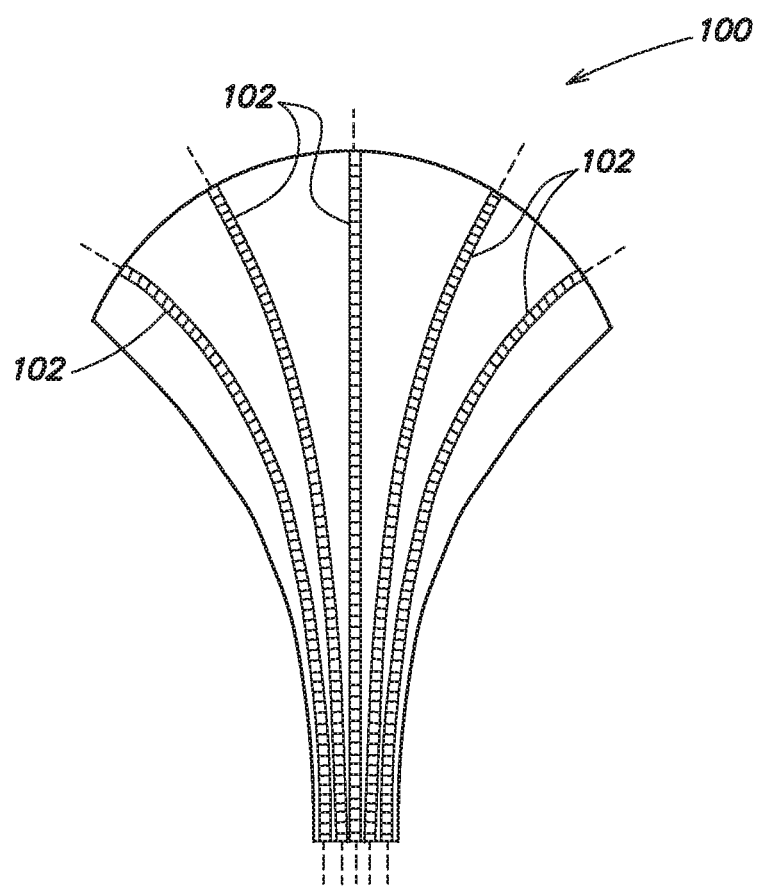
FIG. 1 is an example conventional hemispherical dome-shaped optical element.

Other approaches to addressing multi-directional collection problems have suggested hemispherical dome-shaped optical elements, such as the example conventional optical element 100 shown in FIG. 1. Optical fibers 102 arranged along the perimeter of the dome-shaped element 100 map received optical radiation to a corresponding photo-detector. Specifically, the dome-shaped element 100 allows the associated photo-detector to receive optical radiation over a wider field of view than conventional focusing optics, due to the convex profile of the element 100. While increasing the FOV of the receiver 100 when compared to a traditional photo-detector, the convex profile of the receiver 100 still restricts the aperture diameter of the receiving system based on the acceptance angle of the fibers 102 in the area normal to the optical surface. Often this limits collection to only a fraction of the total number of optical fibers 102. Further, hemispherical dome-shaped optical receivers may experience relative illumination falloff (RIF) at the extremes of the dome-shaped surface, which can further restrict system performance.

Accordingly, various examples of the improved optical receiver and optical system described herein allow a more simplified active optical system, while maintaining a reduced weight, size, and power consumption, when compared to conventional receivers and systems. Specifically, the optical receiver may include a plurality of fused fiber optic bundles positioned to directly collect optical radiation from a scene, and direct that optical radiation to a single photo-detector. In particular, a field of view of each of the fused fiber optic bundles collectively defines a multi-directional (e.g., omnidirectional) field of view of the photo-detector. While in one example the single photo-detector includes a single linear array of unit cells, in other examples, it may include a single unit cell. Such aspects and embodiments may provide significant advantages for ground, mobile, maritime, airborne, and space applications.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 2:
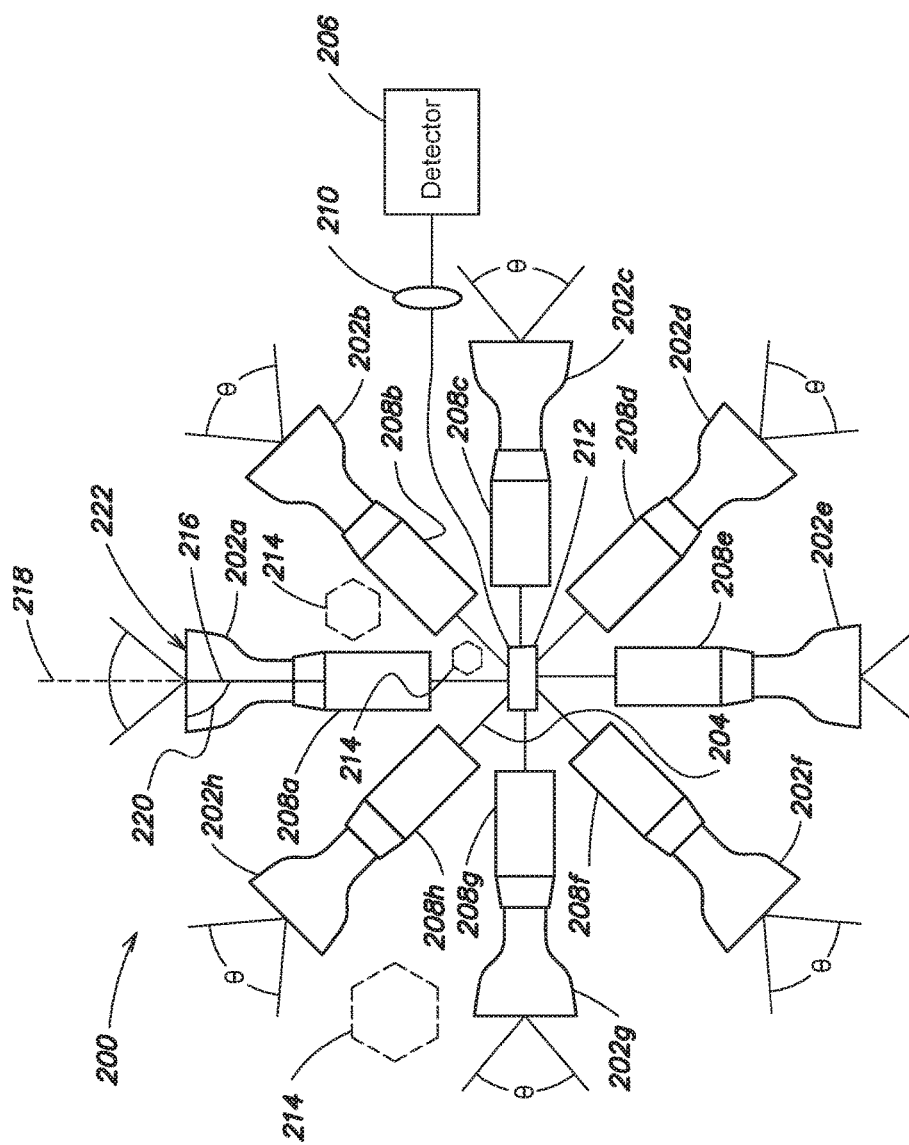
FIG. 2 is an example optical receiver according to aspects of the invention.

FIG. 2 is an example of an optical receiver 200 according to at least one embodiment described herein. Among other components, the optical receiver 200 may include a plurality of fused fiber optic bundles 202 (i.e., fused fiber optic bundles 202a-202h), a fiber optic cable 204, and a single photo-detector 206. As shown, the fiber optic cable 204 may be coupled to the photo-detector 206 and each of the fused fiber optic bundles 202a-202h. In various embodiments, the optical receiver 200 also includes a plurality of fiber couplings 208 (i.e., fiber couplings 208a-208h), one or more optical elements 210 (e.g., a lens), and a fiber optic combiner or switch 212. As shown, each of the fused fiber optic bundles 202a-202h may terminate at a corresponding fiber coupling 208. The fiber couplings 208a-208h may be interposed between individual fused fiber optic bundles 202a-202h and the fiber optic cable 204. The one or more optical elements 210 are positioned to receive and focus optical radiation collected by the fused fiber optic bundles 202a-202h onto the photo-detector 206. Other components of the optical receiver 200, or components of a system including the optical receiver (e.g., a read-out integrated circuit, control circuitry, an optical source, and/or beamforming optics), are discussed below with reference to the example optical system 300 shown in FIG. 3.

In various embodiments, each of the fused fiber optic bundles 202a-202h of the optical receiver 200 is positioned to directly collect optical radiation from a scene. In contrast to various data transmission techniques which may utilize optical fibers to send and receive information, various examples of the fused fiber optic bundles 202a-202h discussed herein may each include one or more optical fiber (e.g., optical fiber 216) positioned to collect optical radiation. In one implementation, each of the fused fiber optic bundles 202a-202h may include numerous individual optical fibers, such as non-imaging optical fibers, fused together during a manufacturing process. For instance, the bundle 202a may include over a million fused optical fibers. In certain embodiments, the fused fiber optic bundles 202a-202h may include numerous unordered non-imaging optical fibers.

Individual optical fibers (e.g., optical fiber 216) of each of the fused fiber optic bundles 202a-202h may be rigid or flexible and may be constructed from glass or any other suitable material. In one example, individual optical fibers may be constructed from an infrared transmitting plastic. Such a material may be advantageous in certain implementations to further reduce the weight of the optical receiver 200 and allow the optical fibers to be included within a structure used as cladding for the fused fiber optic bundles 202a-202h. In various embodiments, the type of optical fiber chosen depends on the wavelength of the optical radiation collected. In particular, each optical fiber of a corresponding fiber optic bundle may be transmissive to the propagating wavelength of collected optical radiation, and may be coated with an anti-reflection coating to maximize efficiency and decrease noise.

In certain embodiments, one or more of the fused fiber optic bundles 202a-202h is a broadband fused fiber optic bundle configured to collect polychromatic incident optical radiation. In such an embodiment, the optical receiver 200 may further include one or more wavelength splitting optics configured to split the polychromatic optical radiation based on wavelength, and map each wavelength to a corresponding portion of the photo-detector 206. In certain other examples, the photo-detector 206 may include a color filter array, such as a Bayer filter, positioned proximate the photo-detector 206 configured to filter the polychromatic optical radiation at the photo-detector 206.

In similar arrangements, one or more of the fused fiber optic bundles 202a-202h may be a polarized fused fiber bundle having a polarized coating on a receiving surface thereof. For example, the polarized coating may enable collection of a single polarization of optical radiation. In such an embodiment, the optical receiver 200 may further include a polarization filter and/or a micro-grid polarizer proximate the photo-detector 206. In one particular implementation, different optical fibers (e.g., optical fiber 216) within one or more of the fused fiber bundles 202a-202h may be arranged to accept polarized light at different angles. Optical radiation corresponding to a first polarization may be split from optical radiation corresponding to a second polarization with a Digital Mirror Device (DMD), which may direct the optical radiation to corresponding portions of the photo-detector 206.

In certain embodiments, each of the fused fiber optic bundles 202a-202h may be a fiber taper. Each fiber taper may define a magnification ratio to expand or reduce the collected optical radiation to a suitable magnification level. For instance, each fiber taper may minify a spot size of collected optical radiation to enable collection at the respective fiber coupling 208a-208h and transmission on the fiber optic cable 204. While in one implementation, each fiber taper may have a magnification ratio of 5:1, in various other implementations the magnification ratio may depend on the particular application. For instance, the magnification ratio of each fiber taper may depend on the number of additional fused fiber tapers within the optical receiver 200.

Each optical fiber (e.g., optical fiber 216) of a fused fiber optic bundle 202 runs from a receiving surface of the corresponding fused fiber bundle, to a corresponding one of the fiber couplings 208a-208h. As shown, each receiving surface may include a substantially planar receiving surface, such as substantially planar receiving surface 222. In the illustrated example of FIG. 2, a first end of each optical fiber included within a respective fused fiber bundle, and a fiber axis (e.g., fiber axis 218) of that respective fused fiber bundle, is positioned at an angle (e.g., angle 220) perpendicular to the substantially planar surface to collect incident optical radiation along the fiber axis. However, in various other examples, the substantially planar receiving surface may be oriented such that the angle (e.g., angle 220) relative to the fiber axis is non-perpendicular, and positioned at a tilted angle (e.g., less than 90 degrees). Such an implementation would permit the fused fiber optic bundle 202 to receive optical radiation along the fiber axis while being positioned to match the contour of a mounting surface.

Accordingly, each optical fiber within a fused fiber optic bundle has a field of view that, when combined with the field of view of the other fibers of that bundle increases the numerical aperture of the fused fiber optic bundle. In FIG. 1, the field of views of the fused fiber optic bundles 202a-202h are illustrated by angular range θ. While in one example, each of the fused fiber optic bundles 202a-202h may have a similar field of view (e.g., 45 degrees), in various other examples, only a portion of the fused fiber optic bundles 202a-202h may share the same field of view, or each of the fused fiber optic bundles 202a-202h may have a different field of view. In the shown example, a second end of the optical fibers of each of the fused fiber optic bundles 202a-202h terminates at the corresponding fiber coupling 208a-208h.

In various embodiments, each of the fused fiber optic bundles 202a-202h may be positioned in a different direction relative to each of the other fused fiber optic bundles 202a-202h. That is, each fused fiber optic bundle may be spaced apart relative to another fused fiber optic bundle in at least one of an x-direction, y-direction, and z-direction, of a Cartesian coordinate system. FIG. 2 illustrates the fused fiber optic bundles 202a-202h spaced apart in a single horizontal plane for the convenience of illustration. In further embodiments, each fused fiber optic bundle may be similarly positioned in more than one plane, such as the x-direction and the y-direction, the x-direction and the z-direction, and the z-direction and the y-direction. In certain further embodiments, each fused fiber optic bundle may be positioned within the x-direction, the y-direction, and the z-direction, to achieve a full isotropic field of view.

In certain embodiments, the number of fused fiber optic bundles 202a-202h included in the receiver 200, and the field of view of each of the fused fiber optic bundles 202a-202h, may be chosen to achieve an omnidirectional FOV for the photo-detector 206. As discussed herein, an omnidirectional FOV may include a FOV that receives optical radiation substantially uniformly in all directions within a given plane (i.e., receives radiation uniformly within the x-direction, the y-direction, or the z-direction, of the Cartesian coordinate system). For example, the optical receiver 200 may include ten fused fiber optic bundles each having a FOV of substantially 36 degrees. Such an arrangement would define a 360 degree field of view for the photo-detector 206. In another example, the optical receiver 200 may include eight fused fiber optic bundles each having a FOV of substantially 45 degrees. In various other implementations, other arrangements of fused fiber optic bundles 202a-202h may be positioned to collectively achieve a substantially 360 degree field of view.

While in at least one example, each of the fused fiber optic bundles 202a-202h may have a substantially uniform field of view, in various other implementations one or more of the fused fiber optic bundles 202a-202h may have a non-uniform field of view. For instance, one or more of the fused fiber bundles 202a-202h may be defined by a substantially non-symmetrical diameter, such as a non-circular diameter. In one example, the diameter of a fused fiber bundle may be substantially rectangular or substantially triangular. Such non-symmetrical arrangements may achieve a non-omnidirectional multi-directional FOV, such as non-circular FOV.

In other arrangements, the fused fiber optic bundles 202a-202h of the optical receiver 200 may be positioned to provide a multi-directional FOV of the photo-detector 206 despite the presence of one or more objects that would otherwise obstruct the optical layout of a conventional optical receiver. Specifically, one or more of the fused fiber optic bundles 202a-202h may be positioned such that the location of the fused fiber optic bundle avoids obstructing object within the presence of the optical receiver or an associated system. For example, FIG. 2 illustrates fused fiber optic bundles 202a, 202b, 202g, 202h positioned such that obstructing objects 214 are outside a field of thereof. In other arrangements, the fused fiber optic bundles 202a-202h may be positioned to achieve a desired FOV while avoiding items that would otherwise break a line of sight of the optical receiver 200. In such an arrangement, fused fiber optic bundles 202a-202h may be symmetrically, non-symmetrically, or arbitrarily positioned to achieve the desired FOV while avoiding other structural and internal components of the optical receiver 200 and/or an associated optical system.

Optical radiation collected by one or more of the fused fiber optic bundles 202a-202h is received by the corresponding fiber coupling 208a-208h at the terminating end of the respective fused fiber optic bundle 202. The one or more fiber couplings 208a-208h may each include a series of inputs and outputs configured to receive the collected optical radiation and propagate the collected optical radiation to the fiber optic cable 204. For example, the fiber couplings 208a-208h may each include a multi-mode fiber coupling having multiple inputs configured to combine the collected optical radiation to a single output. In certain examples, each of the fiber couplings 208a-208h may include a micro-lens array. In particular, the fiber couplings 208a-208h may include a high numerical aperture microlens array having dimensions to match a terminating end of the corresponding fused fiber bundle 202a-202h. The fiber couplings 208a-208h may further include focusing optics, such as one or more collimator, to focus the optical radiation onto the fiber optic cable 204.

In various embodiments, the fiber optic cable 204 is coupled to each of the fused fiber optic bundles 202a-202h by the fiber couplings 208a-208h. The fiber optic cable 204 is configured to receive and propagate the collected optical radiation from the fused fiber optic bundles 202 to the single photo-detector 206. As discussed herein, the plurality of fused fiber optic bundles 202a-202h routed to the single photo-detector 206 by the fiber optic cable 204 define a substantially omnidirectional field of view of the photodetector 206. In one example, the fiber optic cable 204 is a multi-mode fiber optic cable fused into a single optical fiber for efficiently propagating collected optical radiation to the photo-detector 206. In various embodiments, the collected optical radiation may include collected short-wavelength infrared (SWIR) radiation reflected from the scene. However, in various other implementations the optical radiation may include light of other wavelengths within the electromagnetic spectrum, such as near-infrared radiation (NIR), mid-wavelength infrared (MWIR), long-wavelength infrared (LWIR), or visible light.

Collected optical radiation propagates along the length of the fiber optic cable 204 and is received at the single photo-detector 206. As shown, the optical element 210 may be positioned to focus the collected optical radiation onto one or more individual unit cells of the photo-detector 206. The optical element 210 may include a single lens or mirror or a combination of lenses or mirrors. For example, the optical element 210 may be a singlet lens.

In various embodiments, the photo-detector 206 includes a photodetector having a spectral band chosen to match a wavelength of the collected optical radiation. The photo-detector 206 may include a Focal Plane Array (FPA) positioned at a focal plane of the optical receiver 200, and including a plurality of photo-sensitive unit cells (i.e., "pixels") each configured to individually receive the collected optical radiation. When activated, individual unit cells within the FPA integrate photons of radiation impinging on the unit cell. A circuit within each unit cell of the FPA accumulates charge corresponding to the incident radiation. At the end of an integration period, the unit cells may be deactivated, and a read-out value corresponding to the accumulated charge may be provided. In various embodiments, the FPA may include a reduced number of unit cells, such as a single linear array of unit cells (i.e., a single row or column of unit cells). In other embodiments, the photo-detector may include a single unit cell. Unit cells may include complementary metal-oxide semiconductor (CMOS) sensors or charge coupled devices (CCD).

As FIG. 2 shows, in at least one example the optical receiver 200 may include a fiber optic switch 212, or other fiber optic combiner, coupled to the fiber optic cable 204. The fiber optic switch 212 is configured to selectively control the propagation of the collected optical radiation to the photo-detector 206. Specifically, the fiber optic switch 212 may be configured to selectively control propagation from the fused fiber bundles 202a-202h to unit cells of a single linear array of unit cells, or a single unit cell, of the photo-detector 206. While the fiber optic switch 212 is shown in FIG. 2 as a single fiber optic switch for the convenience of illustration, in various other implementations the fiber optic switch may be composed of an plurality of fiber optic switches (or combiners), each switch coupled to a fiber bundle of the fused fiber bundles 202a-202h.

In such an implementation, the fiber optic switch 212 allows unit cells of the photo-detector 206 to be switched to receive optical radiation from the various fused fiber optic bundles 202a-202h of the optical receiver 200. The fiber optic switch 212 may include mechanical switches, electro-optic switches, micro-electro-mechanical switches (MEMS), magneto-optic switches, or acoustic-optic switches, to name a few examples. The fiber optic switch 212 of various embodiments may include a plurality of inputs coupled to each of the fiber couplings 208a-208h via the fiber optic cable 204, each input capable of disengaging with a given fiber coupling. For example, the fiber optic switch 212 may engage with only those fiber optic couplings corresponding to fused fiber optic bundles currently receiving radiation. As the fused fiber optic bundles currently receiving radiation may change as the receiver 200 moves, or the area of the scene viewed changes, the fiber optic switch 212 may rapidly engage and disengage with any of the fiber optic couplings 208a-208h.

Figure 3:
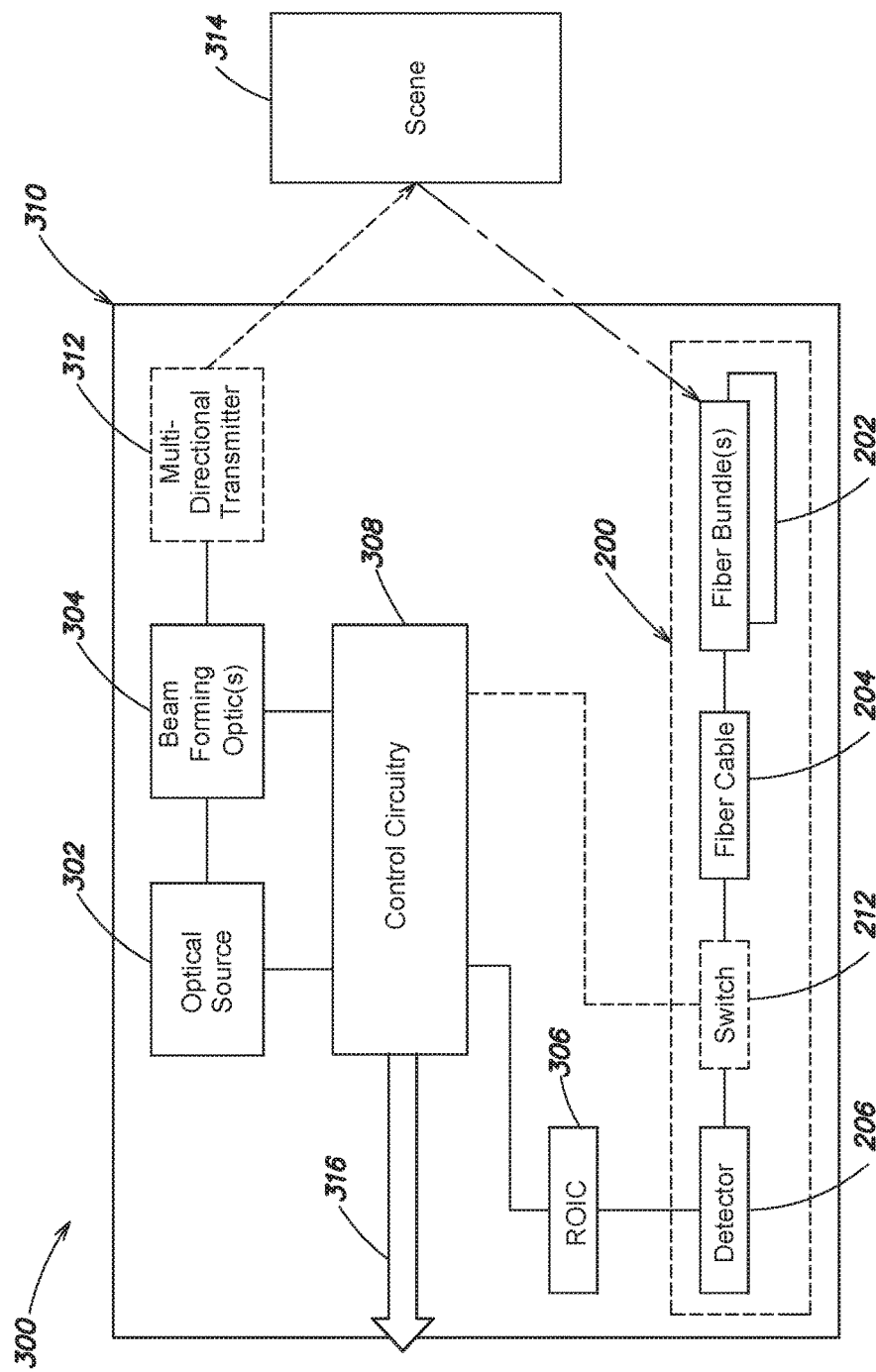
FIG. 3 is an example optical system including the optical receiver illustrated in FIG. 2, according to aspects of the invention

Turning to FIG. 3, shown is an example illustration of an optical system 300 including the optical receiver 200 illustrated in FIG. 2. Among the components of the optical receiver 200, the optical system 300 may include an optical source 302, beam forming optic(s) 304, a read-out integrated circuit (ROIC) 306, and control circuitry 308. As shown, the optical source 302 is coupled to the beam forming optics 304. The system 300 may further include beamsteering optics which direct a beam of optical radiation received from the optical source 302 at a scene 314. Reflections of the optical radiation from the scene 314 are directly collected by the fused fiber optic bundles 202a-202h of the optical receiver 200, and propagated to the photo-detector 206 by the fiber optic cable 204. One or more read-out values from the ROIC 306 coupled to the photo-detector 206 may be used by the control circuitry 308 to generate an output 316. For instance, the output 316 may be used be associated circuitry to determine a direction from which the radiation was received (e.g., which fused fiber bundle received the optical radiation). As shown, components of the optical system 300 may be enclosed within a housing 310 to protect the various components from environmental conditions and excess light.

Though the components of the example optical system 300 shown in FIG. 3 may be shown and described as discrete elements in a block diagram, and may be referred to as "circuitry" or "circuit," unless otherwise indicated, the components may be implemented as one of, or a combination of, analog circuitry, digital circuitry, or one or more microprocessors executing software instructions. The software instructions may include digital signal processing (DSP) instructions. Unless otherwise indicated, signal lines between components of the system 300 may be implemented as discrete analog, digital, or optical signal lines. Unless otherwise indicated, signals may be encoded in either digital or analog form; conventional digital-to-analog or analog-to-digital converters may be included, but are omitted from FIG. 3 to simplify explanation.

In various embodiments, the optical source 302 is in optical communication with the beam forming optics 304 and configured to generate and transmit a beam of optical radiation of a predetermined optical wavelength. The optical source 302 may include any suitable source of optical radiation, such as an SWIR light source, a laser light source, or a visible light source. In one embodiment, optical radiation generated by the optical source 302 is coherent, and the beam forming optic(s) 304 includes one or more collimating optics; although, in various other embodiments the optical source 302 may be in-coherent.

As shown, the beam forming optic(s) 304 are positioned to receive the transmitted beam from the optical source 302. For example, the beam forming optic(s) 304 may receive the transmitted beam of optical radiation via an optical fiber or free space coupling. Responsive to receiving the beam of optical radiation, the beam forming optic(s) 304 may be controlled to shape the beam generated by the optical source 302. One or more beamsteering optics (not shown) may subsequently direct the beam over an area of the scene 314. For instance, the beam may be shaped into a "pencil" beam which illuminates only a desired portion of the scene. Such an implementation may be advantageous when the photodetector 206 includes a single linear array, or when one or more obstructing objects are present.

In one particular example, the optical system 300 may include a multi-directional transmitter 312 configured to provide omnidirectional illumination of the scene 314 based at least in part on the beam of optical radiation received from the beam forming optics 304. While in one instance the multi-directional transmitter 312 may include an enlarged transmission surface, such as a spherical or hemispherical shape, other directional optics may be included to achieve a wide range of illumination within the field of view of the photo-detector 206.

Optical radiation reflected from the scene 314 is directly collected by the fused fiber optic bundles 202a-202h, as discussed above with reference to at least FIG. 2. While referred to herein as optical radiation reflected from the scene 314, in various other embodiments, optical radiation directly collected by the fused fiber optic bundles 202a-202h may include refracted optical radiation, diffracted optical radiation, secondary optical radiation, or any other optical radiation depending on the particular application. The collected optical radiation propagates along the length of the fiber optic cable 204 before being received by one or more unit cells of the photo-detector 206. Propagation along the optic cable 204 may be controlled by the fiber optic switch 212, which is coupled to at least the optic cable 204.

In various embodiments, the ROIC 306 is coupled with the photo-detector 206, and in particular, each unit cell of the photo-detector 206. The ROIC 306 is configured to activate unit cells of the photo-detector 206 during an integration period. At the end of the integration period the ROIC 306 deactivates the activated unit cells, and provides a read-out value to the control circuitry 308 based on the accumulated charge from the received optical radiation. For instance, the ROIC 306 may include a double-buffer and a multiplexer, configured to sequentially draw charges from the photo-detector 206 and generate a continuous data stream to the control circuitry 308.

Each read out value may be transmitted to other components of the optical system 300 and used to sample the scene 314. Specifically, the one or more read-out values may be received by the control circuitry 308. The control circuitry 308 may include a single controller; however, in various other embodiments the control circuitry 308 may consist of a plurality of controllers. While the control circuitry 308 is illustrated separate from one or more components of the optical system 300, in various embodiments, the control circuitry 308 may be combined with one or more other components, such as the ROIC 306. For instance, the control circuitry 308, ROIC 306, and other combined components of the optical system 300, may include a combination of software-configured elements, signal processing circuitry, application specific integrated circuitry, or any combination of various hardware and logic circuitry for performing the various processes discussed herein.

In various embodiments, the control circuitry 308 includes a processor, data storage, a user interface, and one or more interfaces for system components, such as a communication interface. The processor may be coupled to the data storage, the communication interface, and the one or more other interfaces, and be configured to perform a series of instructions that result in manipulated data stored and retrieved from the data storage. The processor may include a commercially available processor, such as a processor manufactured by INTEL, AMD, MOTOROLA, or FREESCALE.

In additional examples, the processor may be configured to execute an operating system. The operating system may provide platform services to application software. These platform services may include inter-process and network communication, file system management, and standard database manipulation. One or more of many operating systems may be used, and examples are not limited to any particular operating system or operating system characteristic. In some examples, the processor may be configured to execute a real-time operating system (RTOS), such as RTLinux, or a non-real time operating system, such as BSD or GNU/Linux.

The instructions stored on the data storage may include executable programs or other code that can be executed by the processor. The instructions may be persistently stored as encoded signals, and the instructions may cause the processor to perform the functions and processes described herein, such as sampling the scene 314 based on one or more read-out values from the ROIC 306. The data storage may include information that is recorded, on or in, the medium, and this information may be processed by the processor during execution of instructions. The data storage includes a computer readable and writeable nonvolatile data storage medium configured to store non-transitory instructions and data. In addition, the data storage includes processor memory that stores data during operation of the processor.

As discussed herein, in various embodiments the photo-detector 206 includes a single unit cell or a single linear array of unit cells. In such embodiments, the one or more read-out values of the photo-detector 206 may be synchronized with an activation state of the fiber optic switch 212. That is, the fiber optic switch 212 may be synchronized with the ROIC 306 such that activated unit cells of the photo-detector 206 are coupled to those fiber optic bundles that are currently receiving optical radiation. For a single linear array of unit cells, optical radiation may be received at the same linear arrangement of unit cells over the course of multiple integration periods.

Accordingly, to sample the scene appropriately, the fiber optic switch 212 may provide one or more activation state signals indicating the activation state corresponding to a given read-out value. Each activation state signal may specify those fused fiber bundles that are currently in optical communication with the photo-detector 206. Each signal indicating an activation state may be used by the control circuitry 308 to orient the read-out values relative to read-out values of a previous integration period, or a subsequent integration period. For instance, read-out values of a single linear array from multiple integration periods may be used to sequentially sample the scene. Similar processes may be performed for a photo-detector 206 including a single unit cell.

Figure 4A:
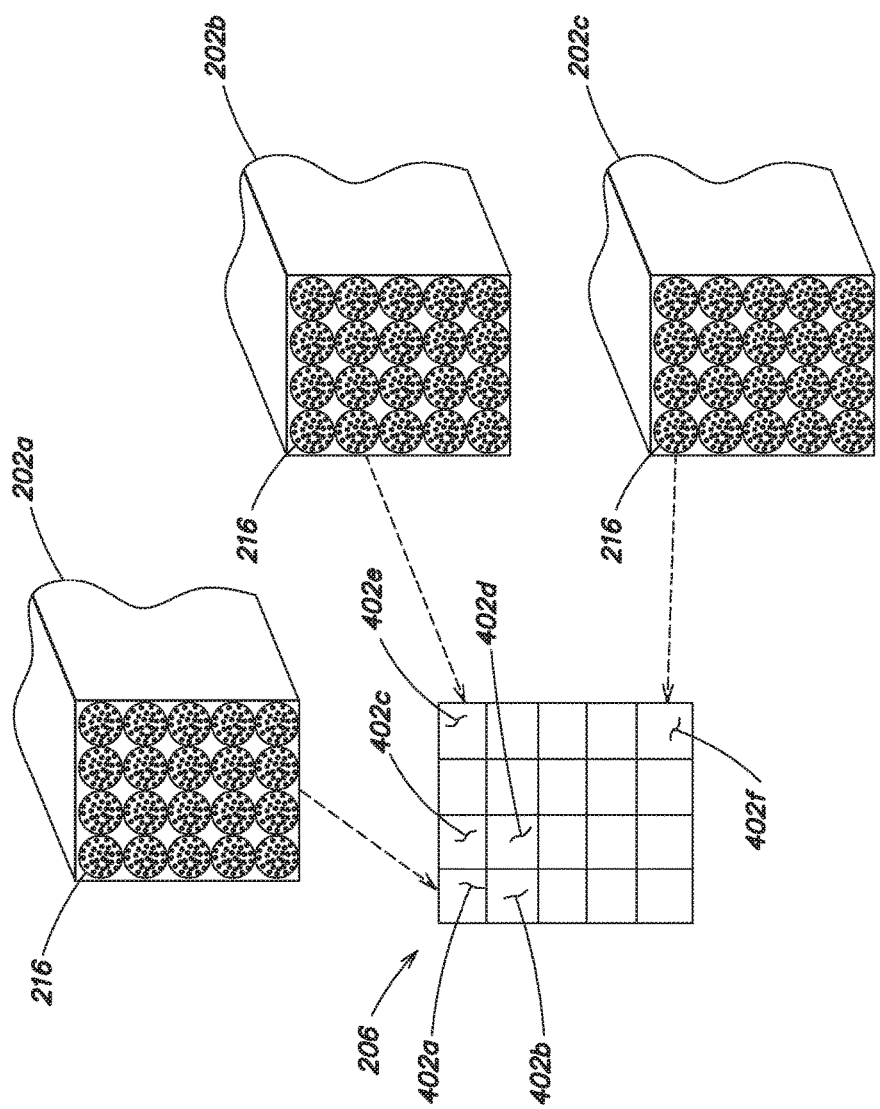

Turning to FIG. 4A, shown is one example illustration of collected optical radiation received at the photo-detector 206 of the optical receiver 200 shown in FIG. 2. In the shown example, the photo-detector 206 includes an array of unit cells arranged in rows and columns. Each fused fiber optic bundle (fused fiber optic bundles 202a-202c are shown) includes a plurality of individual optical fibers 216 arranged in an M by N array in optical communication with an individual unit cell of the photo-detector 206. For instance, fused fiber optic bundle 202a is shown as optically coupled to unit cell 402a, fused fiber optic bundle 202b is shown as optically coupled to unit cell 402e, and fused fiber optic bundle 202c is shown as optically coupled to unit cell 402f. Each of the fused fiber optic bundles 202a-202c may be coupled to the unit cells by the corresponding fiber coupling and optic cable 204, as discussed with reference to FIG. 2.

While in the shown example, each optical fiber 216 of the fused fiber optic bundles 202a, 202b, 202c are shown in optical communication with a single unit cell, in various other embodiments, optical fibers 216 of the fused fiber optic bundles 202a, 202b, 202c may be in optical communication with multiple unit cells, and in particular, in optical communication with various unit cells in groups. For example, a first group of the optical fibers 216 of fused fiber optic bundle 202a may be coupled to unit cell 402a, a second group of the optical fibers 216 of fused fiber optic bundle 202a may be coupled unit cell 402b, a third group of the optical fibers 216 of fused fiber optic bundle 202a may be coupled unit cell 402c, and the remainder of the optical fibers 216 of fused fiber optic bundle 202a may be coupled unit cell 402d. Optical fibers 216 of fused fiber optic bundle 202b and fused fiber optic bundle 202c may be positioned in a similar arrangement.

Turning now to FIG. 4B, shown is a second example illustration of collected optical radiation received at the photo-detector 206 of the optical receiver 200. In the shown example, the photo-detector 206 includes a single linear array of unit cells arranged in a row. Each fused fiber optic bundle (fused fiber optic bundles 202a-202c) includes a plurality of individual optical fibers 216 arranged in an M by N array in optical communication with an individual unit cell of the photo-detector 206. For instance, fused fiber optic bundle 202a is shown as optically coupled to unit cell 412a, fused fiber optic bundle 202b is shown as optically coupled to unit cell 412b, and fused fiber optic bundle 202c is shown as optically coupled to unit cell 412c. Each of the fused fiber optic bundles 202a-202c may be coupled to the unit cells by the corresponding fiber coupling and optic cable 204, as discussed with reference to FIG. 2. While in the shown example, each optical fiber 216 of the fused fiber optic bundles 202a-202c are shown in optical communication with a single unit cell, in various other embodiments, optical fibers of a fused fiber optic bundle may be in optical communication with multiple unit cells, or may be in optical communication with various unit cells in groups of optical fibers, as discussed above with reference to the arrangement of FIG. 4A.

Figure 4C:
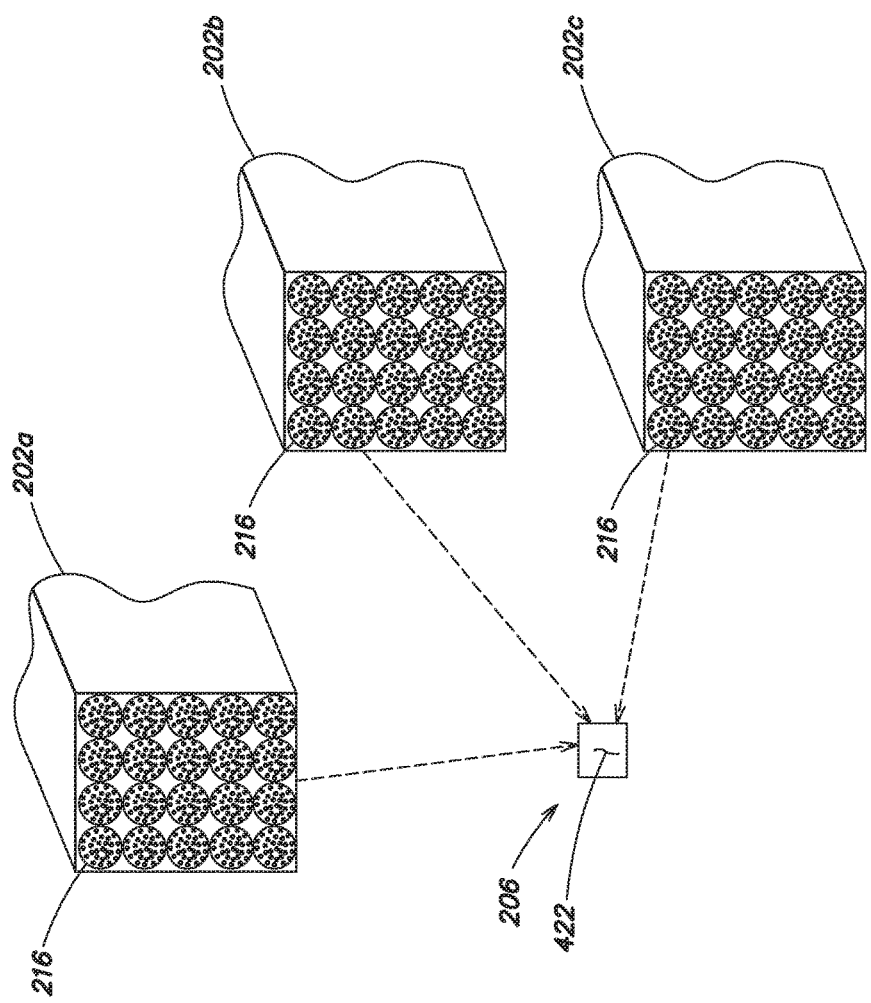

FIG. 4C shows another example illustration of collected optical radiation received at the photo-detector 206 of the optical receiver 200 shown in FIG. 2. In the shown example, the photo-detector 206 includes a single unit cell 422. Each fused fiber optic bundle (e.g., fused fiber optic bundles 202a-202c) includes a plurality of individual optical fibers 216 arranged in an M by N array in optical communication with the single individual unit cell of the photo-detector. For instance, each fused fiber optic bundle 202a-202c may be in selective optical communication with the single unit cell via the fiber optic switch 212. It is appreciated that for certain sampling applications, implementation of a photo-detector having a single unit cell may produce similar sampling results to that of a photo-detector having a full array of unit cells. In these applications, implementation of a photo-detector having a single unit cell, such as the example shown in FIG. 4C, allows design of an optical system having a reduced size, weight, power consumption, and cost.

Figure 5:
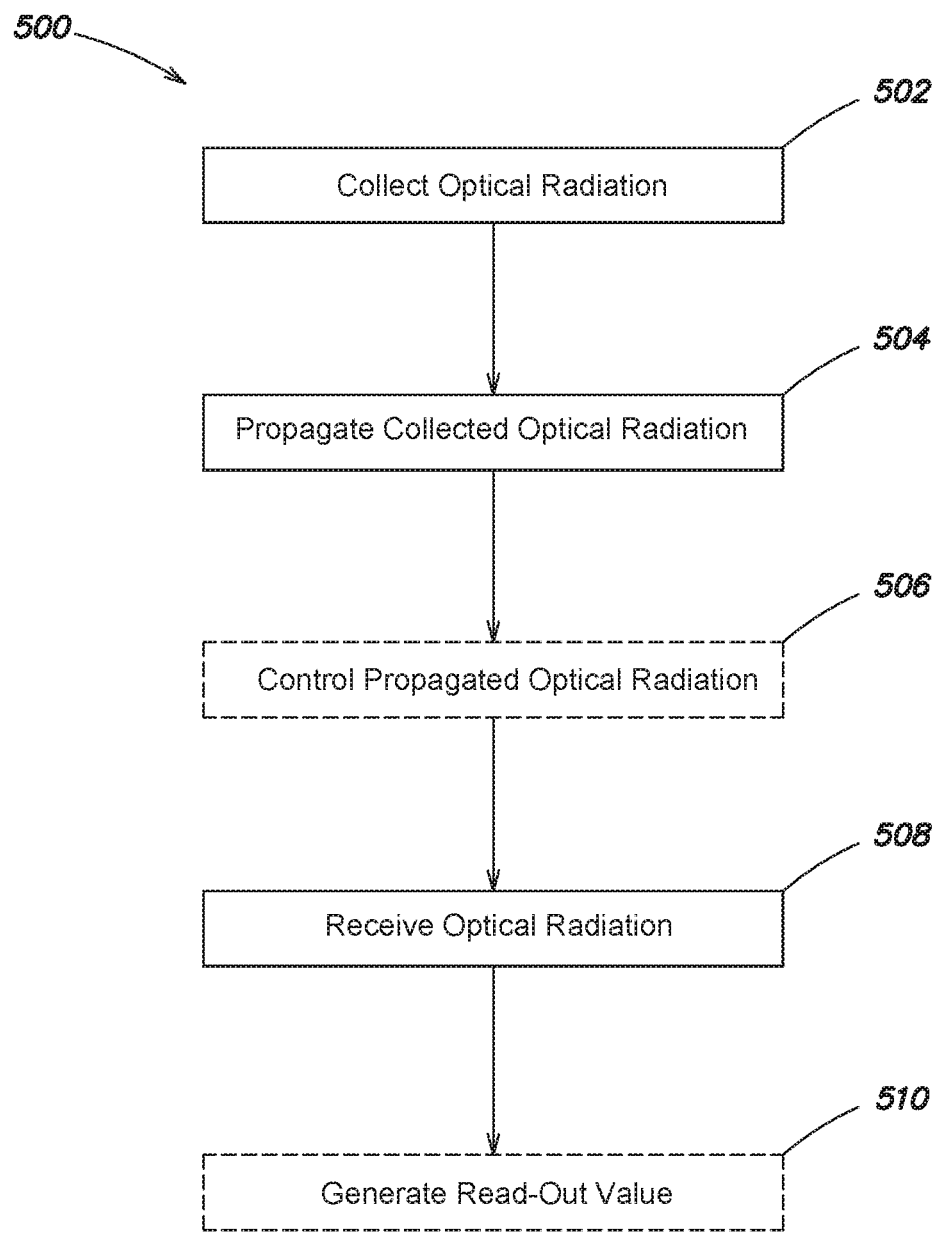
FIG. 5 is an example process flow according to aspects of the invention.

As described above with reference to FIGS. 2-3 and FIGS. 4A, 4B, and 4C, several embodiments perform processes that improve known schemes for multi-directional optical radiation collection. In some embodiments, these processes are executed by an optical receiver, such as the optical receiver 200 described above with reference to FIG. 2. One example of such a process is illustrated in FIG. 5. According to this example, the process 500 may include the acts collecting optical radiation at one or more fused fiber optic bundles, propagating the collected optical radiation, and receiving the optical radiation at a single photo-detector. Process 500 is described with continuing reference to the example optical receiver 200 shown in FIG. 2.

In act 502, the process 500 includes collecting optical radiation from a scene at one or more fused fiber optic bundles of the plurality of fused fiber optic bundles 200 (i.e., fused fiber optic bundles 202a-202h). In various embodiments, each of the fused fiber optic bundles 202a-202h of the optical receiver 200 is positioned to directly collect the optical radiation from the scene. As discussed above, each of the fused fiber optic bundles 202a-202h includes numerous optical fibers (e.g., optical fibers 216) each of which may collect optical radiation incident on an end thereof. In one example, the process 500 may include collecting the optical radiation at a substantially planar receiving surface of one of the fused fiber optic bundles 202a-202h, in contrast to the hemispherical dome-shaped optical receivers. In certain instances, each of the fused fiber optic bundles 202a-202h may be a fiber taper. Accordingly, responsive to collecting the optical radiation, in one embodiment the process 500 may include expanding or reducing a magnification level of the collected optical radiation based at least in part on a magnification ratio of the fiber taper.

In certain embodiments, the process 500 may include receiving the collected optical radiation at the one or more fiber couplings 208a-208h coupled to each of the fused fiber optic bundles 202a-202h. In act 504, the process 500 may then include propagating the collected optical radiation along a length of the optic cable 204. As further discussed with reference to FIG. 2, in various embodiments each of the plurality of fused fiber optic bundles 202a-202h is coupled to the optic cable 204 via the corresponding fiber coupling. The fiber optic cable 204 is positioned to receive and propagate the collected optical radiation to one or more unit cells of the single photo-detector 206. As discussed herein, multiple fused fiber optic bundles routed to a single photo-detector by the fiber optic cable 204 may define a substantially omnidirectional field of view of the photo-detector 206.

In act 506, the process 500 may include selectively controlling the propagation of the collected optical radiation with the fiber optic switch 212 coupled to the fiber optic cable 204. In at least one example, the act of selectively controlling the propagation of the collected optical radiation includes routing the collected optical radiation to the single unit cell or the single linear array of unit cells of the photo-detector of one embodiment. In one implementation, the fiber optic switch 212 allows unit cells of the photo-detector 206 to be switched to various fused fiber optic bundles of the optical receiver 200. Accordingly, the fiber optic switch 212 may engage with only those fiber optic couplings corresponding to fused fiber optic bundles 202a-202h currently receiving optical radiation. As the fused fiber optic bundles currently receiving radiation may change as the system moves, or the area of the scene illuminated changes, the process 500 may include rapidly engaging and disengaging with any of the fiber optic couplings 208a-208h.

In act 508, the process 500 includes receiving the collected optical radiation at the photo-detector 206 coupled to the multi-mode fiber optic cable 204. In certain embodiments, the process 500 may further include the act of directing the collected optical radiation onto one or more unit cells of the photo-detector 206 with one or more optics (e.g., lens 210) interposed between the multi-mode fiber optic cable 204 and the photo-detector 206. As discussed above with reference to at least FIG. 2, in various embodiments a field of view of each fused fiber optic bundle of the plurality of fused fiber optic bundles 202a-202h collectively defines a substantially omnidirectional field of view of the photo-detector 206. Accordingly, in various embodiments the process 500 may further include the act of generating one or more read-out values based on the collected optical radiation (act 510), and the act of sampling the scene based at least in part on the read-out values. As also discussed herein, the one or more read-out values may be synchronized with the activation state of the fiber optic switch 212 to accommodate a photo-detector 206 including a single linear array of unit cells or a single unit cell.

As discussed with reference to the example optical receiver 200 of FIG. 2, in various embodiments, each of the fused fiber optic bundles 202a-202h may be positioned in a different direction, or location, relative to each of the other fused fiber optic bundles 202a-202h. In certain other embodiments, the fused fiber optic bundles 202a-202h of the optical receiver 200 may be positioned to provide a multi-directional angular range of the photo-detector 206 despite one or objects that would otherwise obstruct the field of view of a conventional photo-detector. Specifically, one or more of the fused fiber optic bundles 202a-202h may be positioned such that a field of view of each of the fused fiber optic bundles 202a-202h avoids an obstructing object, or positioned such that obstructions are allowed within the associated optical system without compromising a field of view. In such an embodiment, the process 500 may include adjusting a position of one or more of the fused fiber optic bundles 202a-202h to avoid the obstructing objects. For instance, adjusting a position of one or more of the fused fiber optic bundles 202a-202h may include increasing or decreasing a default spacing between a first fused fiber optic bundle and a second fused fiber optic bundle. Such embodiments may be particularly beneficial when applications desire collection of optical radiation in closed spaces or in environments where movement of the optical receiver 200 is impaired.

Accordingly, aspects and embodiments are generally directed to optical systems and methods, and in particular, to optical receivers having a multi-directional field of view, and methods of using the same. One example of an optical receiver includes a plurality of fused fiber optic bundles positioned to directly collect optical radiation from a scene, and direct that optical radiation to a single photo-detector. In particular, a field of view of each of the fused fiber optic bundles collectively defines a multi-directional (e.g., omni-directional) field of view of the photo-detector. In addition to allowing a more simplified active optical system, various aspects and embodiments provide a reduced weight, size, and power consumption optical receiver for ground, mobile, maritime, airborne, and space applications. Particularly, the photo-detector may include a reduced size photo-detector having a single linear array of unit cells or a single unit cell. Such aspects and embodiments further simplify the optical receiver and reduce weight, size, and power consumption of the associated optical system.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical receiver comprising:
   a plurality of fused fiber optic bundles, each fused fiber optic bundle including a bundle of unordered non-imaging optical fibers and being positioned to directly collect optical radiation from a scene at a corresponding planar receiving surface thereof, at least a first fused fiber optic bundle of the plurality of fused fiber optic bundles including a polarized coating on the corresponding planar receiving surface thereof;
   a multi-mode fiber optic cable coupled to each fused fiber optic bundle of the plurality of fused fiber optic bundles, the multi-mode fiber optic cable configured to propagate the collected optical radiation from each of the plurality of fused fiber optic bundles along a length of the multi-mode fiber optic cable;
   a photo-detector having at least one unit cell, the photo-detector coupled to the multi-mode fiber optic cable and configured to receive the collected optical radiation from the plurality of fused fiber optics bundles via the multi-mode fiber optic cable, wherein in combination a field of view of each fused fiber optic bundle of the plurality of fused fiber optic bundles collectively defines an omnidirectional field of view of the photo-detector; and
   a fiber optic switch coupled to the multi-mode fiber optic cable, the fiber optic switch being configured to selectively control propagation of the collected optical radiation to the at least one unit cell of the photo-detector.

2. The optical receiver according to claim 1, further comprising a plurality of fiber couplings interposed between each fused fiber optic bundle and the multi-mode fiber optic cable, wherein at least one of the plurality of fiber couplings includes a microlens array.

3. The optical receiver according to claim 1, wherein the at least one unit cell is a single linear array of unit cells, each unit cell receiving the collected optical radiation from the bundle of unordered non-imaging optical fibers of at least one of the fused fiber optic bundles.

4. The optical receiver according to claim 3, further comprising:
   a read-out integrated circuit coupled to the photo-detector and configured to generate one or more read-out values based on the collected optical radiation, the one or more read-out values being synchronized with an activation state of the fiber optic switch.

5. The optical receiver according to claim 1, wherein the at least one unit cell is a single unit cell that receives the collected optical radiation from the plurality of fused fiber optics bundles.

6. The optical receiver according to claim 5, further comprising:
   a read-out integrated circuit coupled to the photo-detector and configured to generate one or more read-out values based on the collected optical radiation, the one or more read-out values being synchronized with an activation state of the fiber optic switch.

7. The optical receiver according to claim 1, wherein at least one of the plurality of fused fiber optic bundles includes a broadband fused fiber optic bundle positioned to collect polychromatic optical radiation, and wherein the photo-detector further includes a color filter array configured to sort the polychromatic optical radiation by wavelength.

8. The optical receiver according to claim 1, wherein the omnidirectional field of view includes a 360 degree field of view relative to a receiving surface of a first fused fiber optic bundle of the plurality of fused fiber optic bundles.

9. The optical receiver according to claim 1, further comprising a single lens interposed between the multi-mode fiber optic cable and the photo-detector, the lens being positioned to focus the collected optical radiation from the plurality of fused fiber optic bundles onto the at least one unit cell of the photo-detector.

10. A method of receiving optical radiation, the method comprising:
- directly collecting optical radiation from a scene at a plurality of fused fiber optic bundles each including a bundle of unordered non-imaging optical fibers;
- propagating the collected optical radiation along a length of a multi-mode optic cable coupled to each fused fiber optic bundle of the plurality of fused fiber optic bundles;
- selectively controlling propagation of the collected optical radiation with a fiber optic switch coupled to the multi-mode fiber optic cable; and
- receiving the collected optical radiation at a single unit cell of a photo-detector, the photo-detector coupled to the multi-mode fiber optic cable, wherein in combination a field of view of each fused fiber optic bundle of the plurality of fused fiber optic bundles collectively defines an omnidirectional field of view of the photo-detector.

11. The method according to claim 10, the method further comprising:
- generating one or more read-out values based on the collected optical radiation, the one or more read-out values being synchronized with an activation state of the fiber optic switch.

12. The method according to claim 10, wherein collecting the optical radiation includes collecting the optical radiation at a corresponding planar receiving surface of each fused fiber optic bundle, the planar receiving surface being disposed at an angle relative to a fiber axis of the respective fused fiber optic bundle.

13. The method according to claim 12, wherein collecting the optical radiation includes collecting the optical radiation along the fiber axis of the respective fused fiber optic bundle, and wherein the angle relative to the fiber axis is non-perpendicular.

14. The method according to claim 13, the method further comprising focusing the collected optical radiation onto the single unit cell of the photo-detector with a single lens interposed between the multi-mode fiber optic cable and the photo-detector.

15. An optical system comprising:
- an optical source configured to emit optical radiation toward a scene;
- a plurality of fused fiber optic bundles, each fused fiber optic bundle including a bundle of unordered non-imaging optical fibers, and each fused fiber optic bundle of the plurality of fused fiber optic bundles being positioned to directly collect optical radiation reflected from the scene;
- a multi-mode fiber optic cable coupled to each fused fiber optic bundle of the plurality of fused fiber optic bundles, the multi-mode fiber optic cable being configured to propagate the collected optical radiation from each of the plurality of fused fiber optic bundles along a length of the multi-mode fiber optic cable;
- a photo-detector including a single unit cell, the photo-detector coupled to the multi-mode fiber optic cable and configured to receive the collected optical radiation from the plurality of fused fiber optic bundles at the single unit cell, wherein in combination a field of view of each fused fiber optic bundle of the plurality of fused fiber optic bundles collectively defines a distributed aperture of the optical system; and
- a fiber optic switch coupled to the multi-mode fiber optic cable, the fiber optic switch being configured to selectively control propagation of the collected optical radiation to the photo-detector.

16. The optical system according to claim 15, further comprising a read-out integrated circuit coupled to the photo-detector and configured to generate one or more read-out values based on the collected optical radiation, the one or more read-out values being synchronized with an activation state of the fiber optic switch.

17. The optical system according to claim 15, wherein a receiving surface of each fused fiber optic bundle is defined by a non-symmetrical diameter.

\* \* \* \* \*